United States Patent [19]

Edwards et al.

[11] Patent Number: 4,745,818

[45] Date of Patent: May 24, 1988

[54] DIFFERENTIAL WITH ANGULARLY OFFSET HOLDOUT RINGS

[75] Inventors: Timothy R. Edwards, Warren; John J. Schoeberle, Troy, both of Mich.

[73] Assignee: Dyneer Corporation, Scottsdale, Ariz.

[21] Appl. No.: 8,966

[22] Filed: Jan. 30, 1987

[51] Int. Cl.⁴ ............................................. F16H 35/04
[52] U.S. Cl. ......................................... 74/650; 74/710
[58] Field of Search ........................ 74/650, 710, 714; 192/50

[56] References Cited

U.S. PATENT DOCUMENTS

| | | | |
|---|---|---|---|
| 2,638,794 | 5/1953 | Knoblock | 74/650 |
| 2,667,087 | 1/1954 | Myers | 74/650 |
| 2,667,088 | 1/1954 | Myers | 74/650 |
| 2,830,466 | 4/1958 | Myers | 74/650 |
| 3,359,803 | 12/1967 | Long | 74/650 |
| 3,397,593 | 8/1968 | Knoblock | 74/650 |
| 3,451,496 | 6/1969 | Myers | 74/650 |
| 3,791,238 | 2/1974 | Bokovoy | 74/650 |
| 4,400,996 | 8/1983 | Schou | 74/650 |
| 4,424,725 | 1/1984 | Bawks | 74/650 |
| 4,524,640 | 6/1985 | Neumann et al. | 74/650 |
| 4,557,158 | 12/1985 | Dissett et al. | 74/650 |
| 4,569,250 | 2/1986 | Nellums | 74/650 |
| 4,644,818 | 2/1987 | Choma et al. | 74/650 |

FOREIGN PATENT DOCUMENTS

| | | | |
|---|---|---|---|
| 485519 | 10/1953 | Italy | 74/650 |
| 168401 | 12/1955 | Sweden | 74/650 |
| 2083875 | 9/1981 | United Kingdom | 192/50 |
| 2109487 | 5/1982 | United Kingdom | 74/650 |
| 2140103 | 7/1983 | United Kingdom | 192/50 |

OTHER PUBLICATIONS

No Spin Differential Operating Manual, 1973, Detroit Automotive.

Primary Examiner—Leslie A. Braun
Assistant Examiner—James W. Innskeep
Attorney, Agent, or Firm—Laubscher & Laubscher

[57] ABSTRACT

A differential is disclosed for driving the steering wheels of a multi-wheel-drive vehicle, including holdout rings for maintaining in a disengaged condition an output shaft that overruns an associated output shaft by a given amount. In order to decrease the turning radius of the vehicle, the lug portions on one holdout ring are angularly displaced relative to the lug portions on the other holdout ring, whereby the overrunning output shaft is maintained in a disengaged condition during a sharp turn that produces overrunning of the output shaft above a given value.

5 Claims, 8 Drawing Sheets

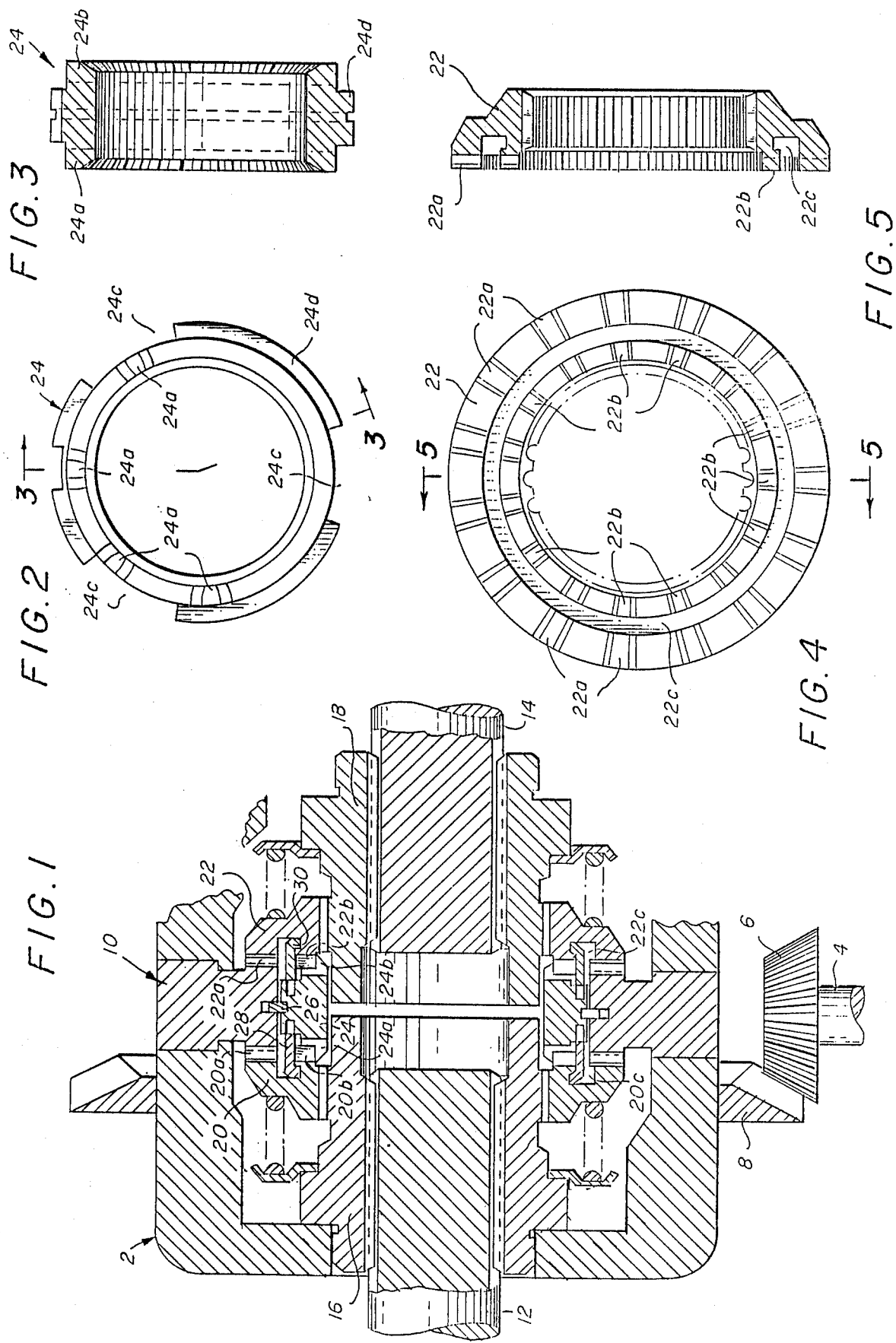

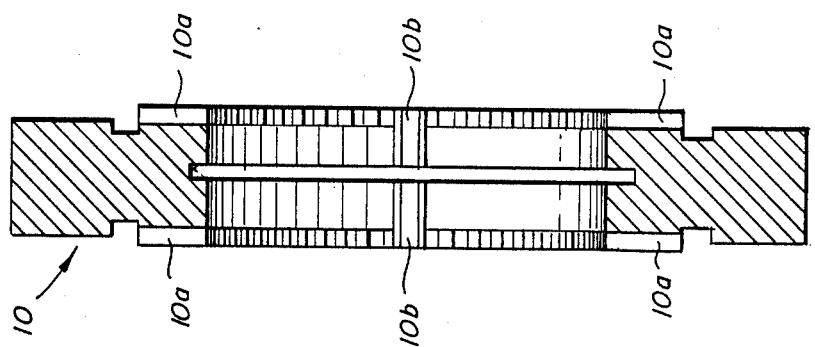
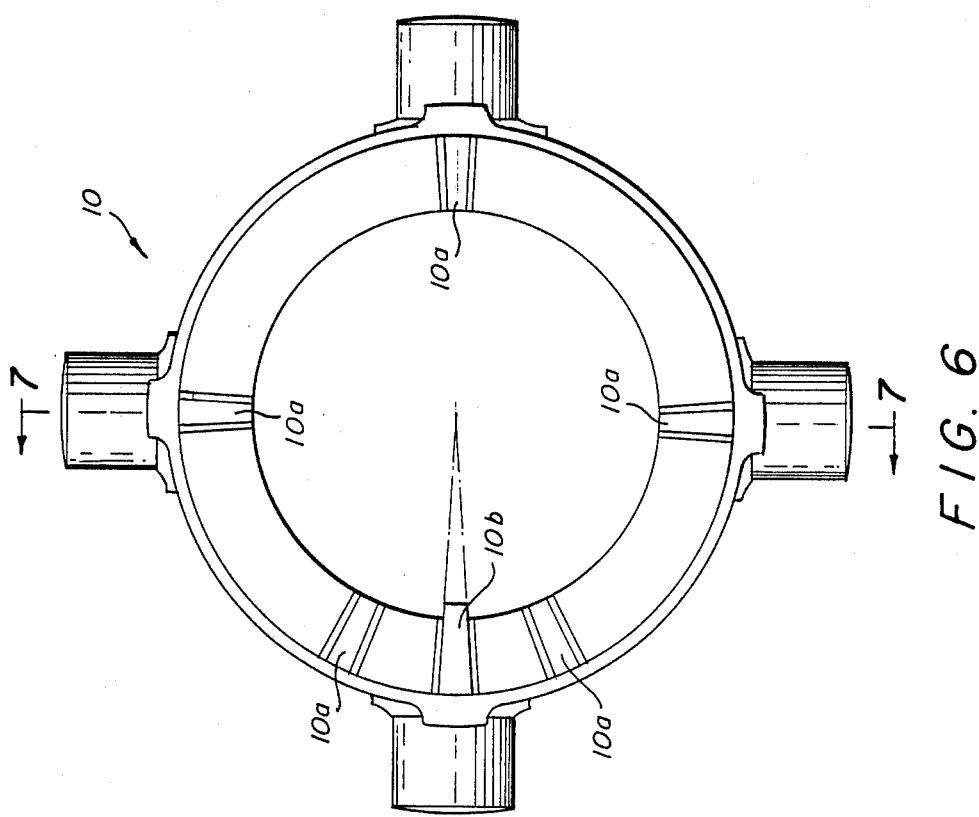
FIG. 7
FIG. 6

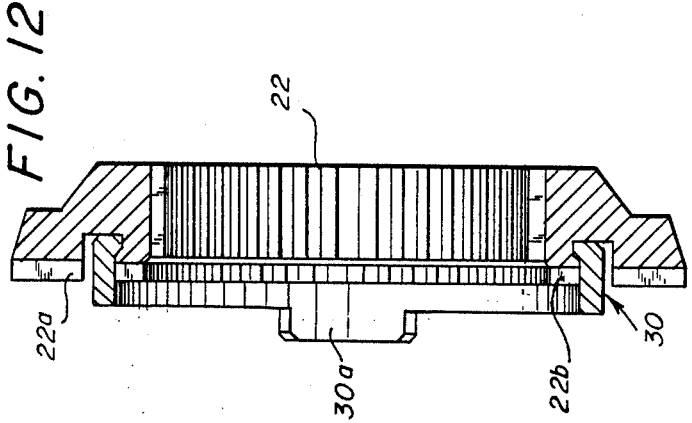
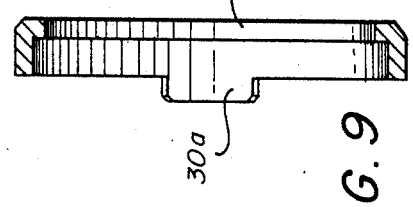
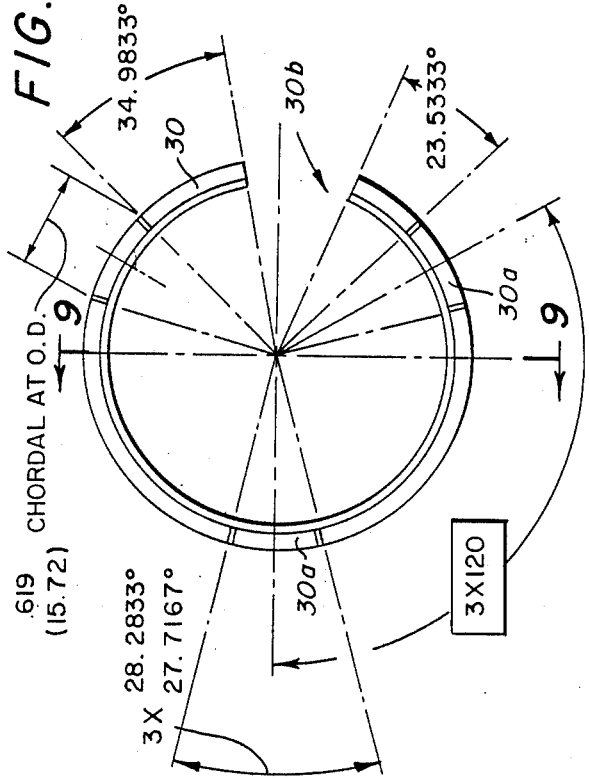
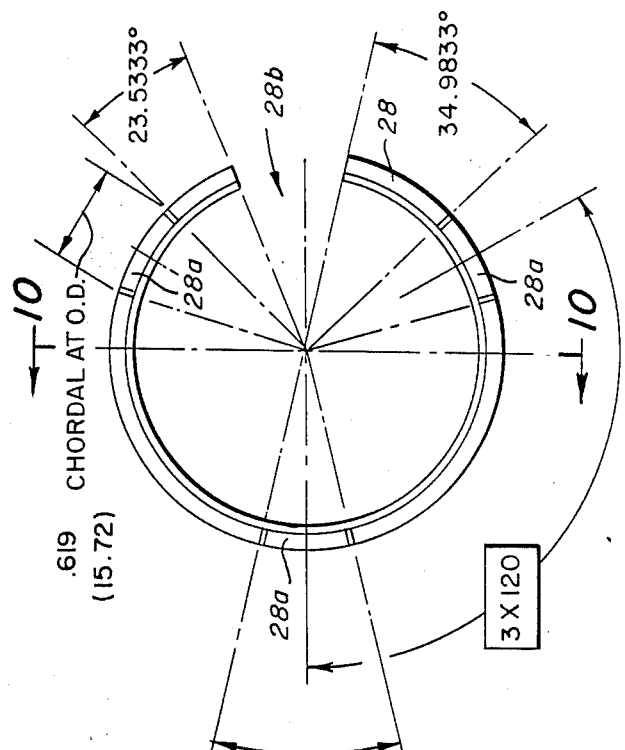
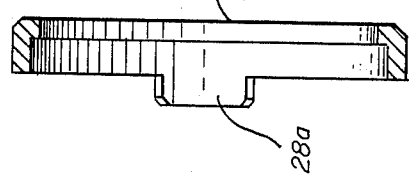

LOCKED STRAIGHTAWAY
(Drive Condition)

LOCKED STRAIGHTAWAY
(Drive Condition)

UNLOCKED LEFT TURN
(Drive Condition)

UNLOCKED LEFT TURN
(Drive Condition)

LOCKED LEFT TURN
with 50° steer axle
(Coast Condition)

UNLOCKED LEFT TURN
50° steer axle
(Coast Condition)

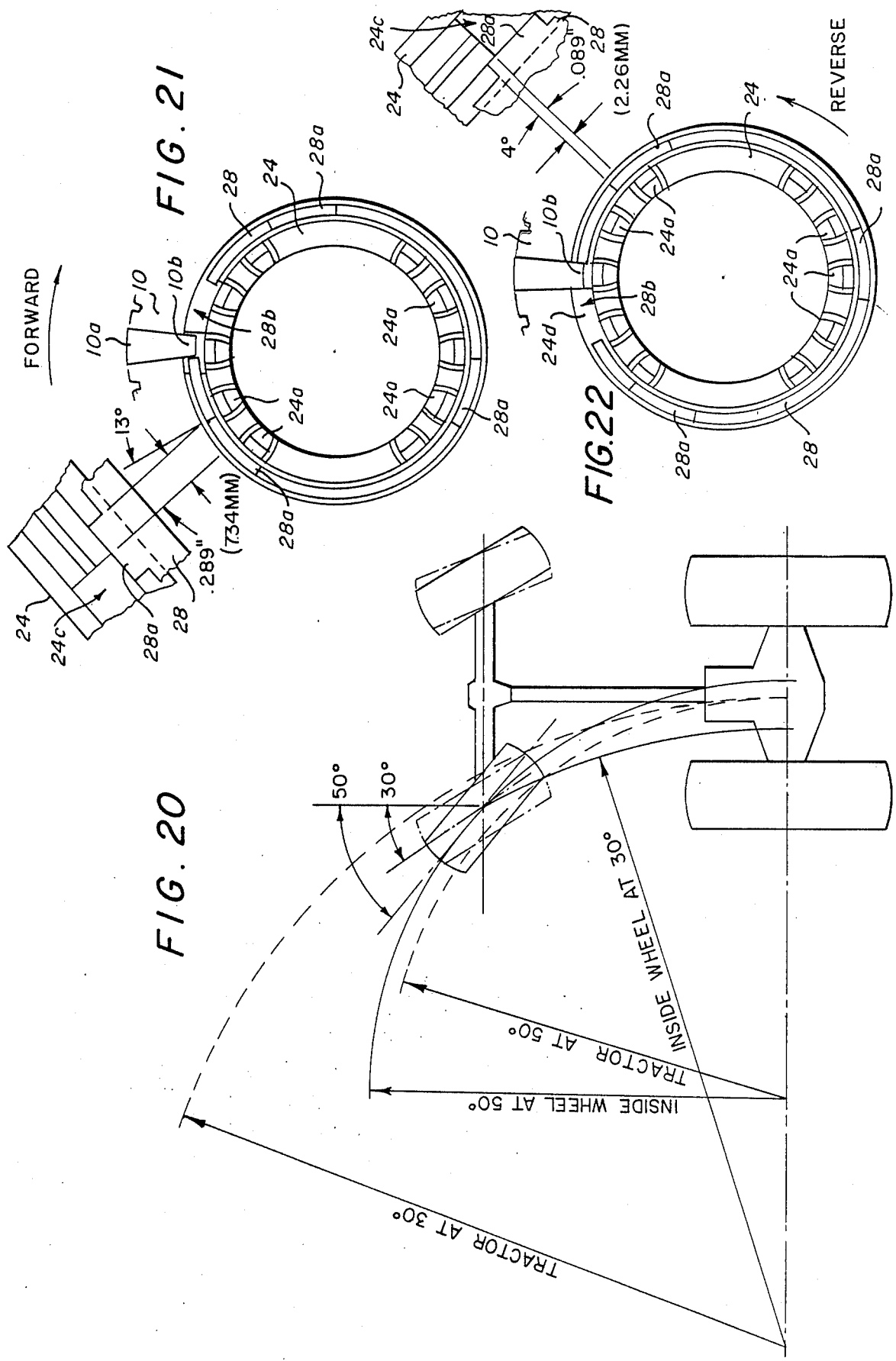

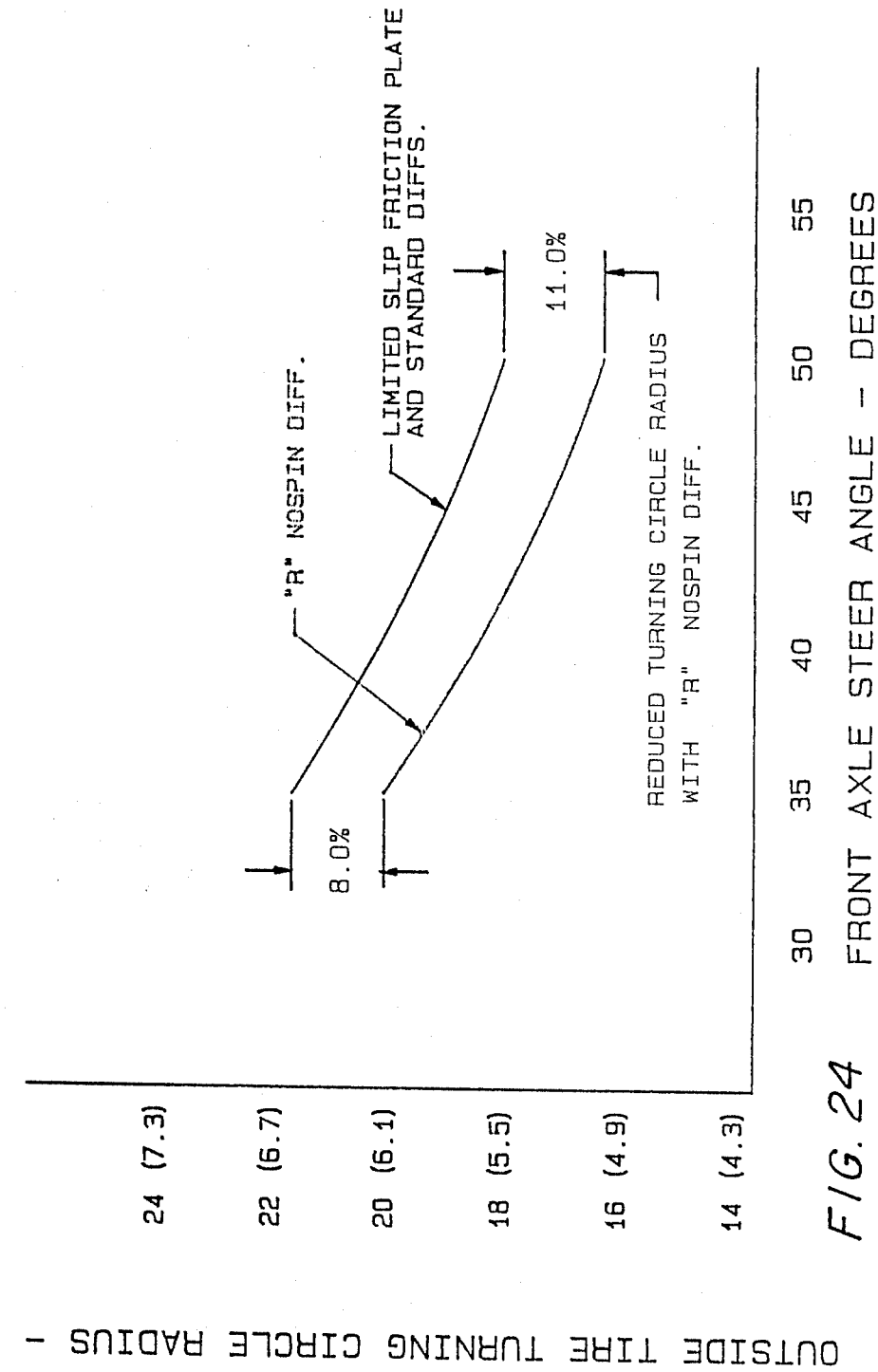

DIFFERENTIAL WITH ANGULARLY OFFSET HOLDOUT RINGS

BRIEF DESCRIPTION OF THE PRIOR ART

This invention relates to an improved differential for use in a front steering multi-wheel-drive vehicle to increase the turning capability thereof.

It is known in the patented prior art to provide differentials of the overrunning holdout ring type including holdout rings for maintaining an overrunning output shaft in a disengaged condition (as might occur, for example, during a turn). Examples of such differentials are shown in the U.S. Pat. No. to Knoblock 2,638,794, Bokovoy U.S. Pat. No. 3,791,238, Myers U.S. Pat. No. 2,830,466, Bawks U.S. Pat. No. 4,424,725 and Neumann et al U.S. Pat. No. 4,524,640, among others. These known differentials—which were assigned to the predecessor companies of the instant assignee—are normally used for driving from the vehicle drive shaft the output shafts associated with the driven wheels of the vehicle.

In the development of differentials for use with front-steering four-wheel-drive agricultural tractors and other off-road equipment, it has been proposed to drive the shafts of the steerable wheels via the differential, and owing to the relatively tight turning radii to which the wheels are subjected, it has been found that one drive output shaft often overruns the associated output shaft by such an extent as to effect re-engagement of the overrunning shaft (for example, when the tractor turning angle is greater than 42° without any secondary operational problems).

The present invention was developed to provide an improved differential of the overrunning holdout ring type for installation in the front axle steering system of a four-wheel-drive agricultural tractor to afford a far smaller turning circle than is provided by either a differential of the friction plate type or a conventional differential, and also keeps the outside wheel disengaged, causing less ground disturbance.

SUMMARY OF THE INVENTION

Accordingly, a primary object of the present invention is to provide a differential of the overrunning holdout ring type wherein the lug portions of one holdout ring are angularly displaced relative to the lug portions of the other holdout ring, whereby the steering wheels of a front-wheel-steered four-wheel-drive tractor or the like can be turned through a relatively greater steering angle without re-engagement of the clutches. The lug portions are arranged in equally-circumferentially-spaced relation on the C-shaped holdout rings, the lugs of one holdout ring being displaced at a given angle from the gap defined in the one holdout ring, and the lugs of the other holdout ring being angularly offset at a different angle relative to the gap in said other holdout ring.

BRIEF DESCRIPTION OF THE DRAWINGS

Other objects and advantages of the invention will become apparent from a study of the following specification when viewed in the light of the accompanying drawings, in which:

FIG. 1 is a sectional view of the improved differential of the present invention;

FIG. 2 is a front elevational view of the center cam member of the differential of FIG. 1, and FIG. 3 is a sectional view taken along line 3—3 of FIG. 2;

FIG. 4 is a front elevational view of one of the clutch members of FIG. 1, and FIG. 5 is a sectional view taken along line 5—5 of FIG. 4;

FIG. 6 is a plan view of the center drive member of FIG. 1, and FIG. 7 is a sectional view taken along line 7—7 of FIG. 6;

FIG. 8 is a front elevational view of the right-hand holdout ring of FIG. 1, and FIG. 9 is a sectional view taken along line 9—9 of FIG. 8;

FIG. 10 is a sectional view taken along line 10—10 of FIG. 11, which figure is a front elevational view of the left-hand holdout ring of FIG. 1;

FIG. 12 is a detailed sectional view illustrating the manner of rotatable connection between a holdout ring and its associated clutch member;

FIG. 20 is a diagram illustrating the turning circle speed change (torque reversal) for the inside wheel of a tractor turning at 30° and at 50°, respectively;

FIGS. 21 and 22 are exploded diagrams illustrating the operation of a holdout ring in its two angularly adjustable end limit positions relative to the key means on the center drive member, when operated in the forward and reverse directions, respectively; and FIGS. 23 and 24 are graphs illustrating the turning circle versus steering angle for inside and outside tire turning circle radii, respectively.

DETAILED DESCRIPTION

Figure 13:
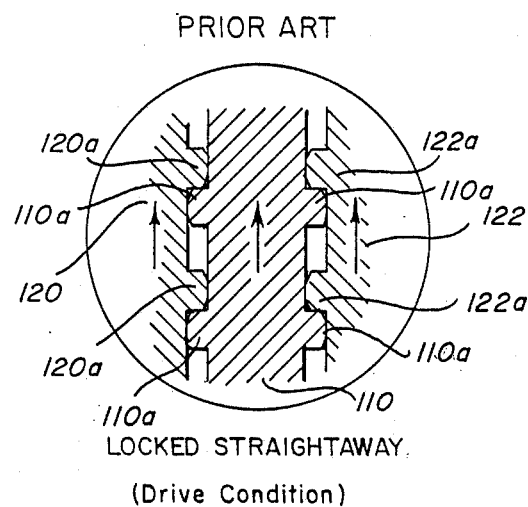
FIGS. 13-15 are diagrams illustrating the operation of a prior art differential of the holdout ring type during straight, intermediate and 50° turn steering conditions, respectively.

Referring first more particularly to FIG. 1, the differential apparatus of the present invention includes a housing 2 rotatably driven by drive shaft 4 via pinion 6 and ring gear 8, said housing containing an annular drive member 10 arranged concentrically about the adjacent ends of a pair of colinearly arranged output shafts 12 and 14. Side gears 16 and 18 are non-rotatably mounted on the output shafts and carry the axially displaceable clutch members 20 and 22 that are normally spring-biased inwardly toward clutch engaged positions in which clutch teeth 20a and 22a engage corresponding teeth 10a on opposite sides of the center drive member 10.

A conventional center cam member 24 is mounted concentrically within the center drive member and is keyed for rotation relative thereto by snap ring 26. The center cam member includes at opposite ends a plurality of cam teeth 24a and 24b that cooperate with corresponding cam teeth 20b and 22b on the clutch members 20 and 22, respectively. A pair of colinearly arranged holdout rings 28 and 30 are rotatably mounted at their remote ends in grooves 20c and 22c contained in the adjacent faces of clutch members 20 and 22, respectively. Each holdout ring has a generally C-shaped configuration and is biased radially inwardly for frictional engagement with the associated clutch member, as illustrated in FIG. 12. The holdout rings 28 and 30 are provided at their adjacent sides with axially-projecting circumferentially-spaced lug portions 28a and 30a that normally extend within corresponding grooves 24c contained in the external center support shoulder portion 24d of center cam 24 when clutch members 20 and 22 are in their clutch-engaged positions of FIG. 1.

In accordance with a characterizing feature of the present invention, the equally-circumferentially-spaced lug portions of one holdout ring are angularly displaced relative to those of the other holdout ring, thereby to afford a tighter turning radius of the vehicle in connection with which the differential is used, since the differential of the present invention maintains disengagement of the outside wheel. Referring to FIGS. 8–11 it will be seen that for the left hand holdout ring 28, the lug portions adjacent the gap 28b have angular spacing angles of 23.5333° and 34.9833°, respectively, while in the right holdout ring 30, these angular spacing angles are reversed. The extent of angular displacement of the holdout rings 28 and 30 is limited by radially inwardly directed stop portions 10b on the center drive member (as shown in FIGS. 6, 7, 21 and 22) that extend into the gaps in the holdout rings, respectively.

Figure 16:
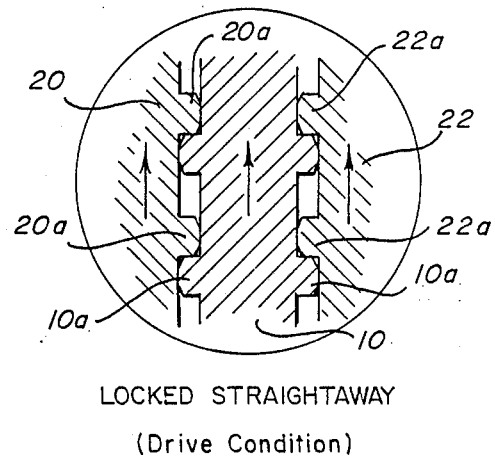
FIGS. 16-18 illustrate the operation of the differential apparatus of the present invention during; similar steering conditions.
Figure 14:
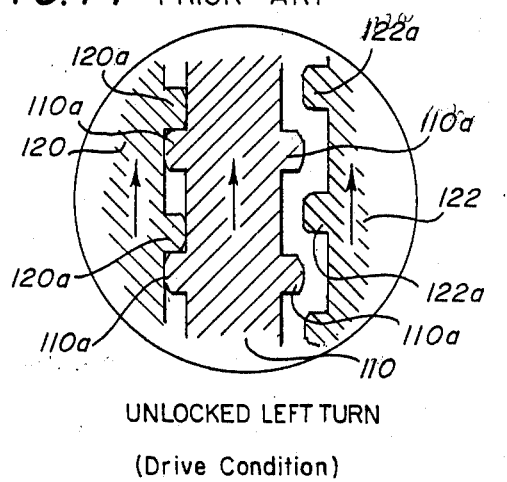
Figure 17:
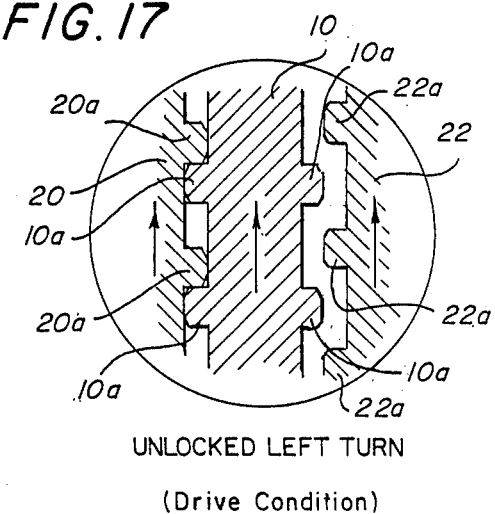
Figure 15:
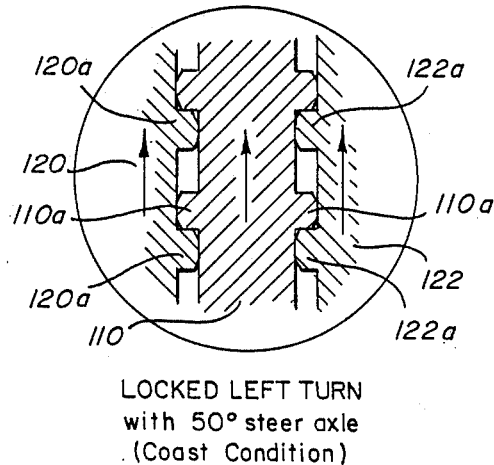
Figure 18:
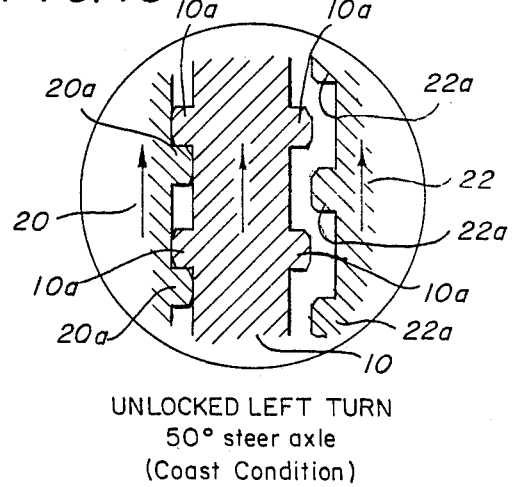

Referring to FIGS. 13–15, it wil be seen that with a prior differential (such as that of the aforementioned Bokovoy patent), when the vehicle starts a left turn, the overrunning right hand clutch member 122 is disengaged owing to the cooperation between the cooperating cam teeth (not shown), but when a 50° steer condition is reached, the torque teeth 110a and 122a re-engage to permit undesired return of the right hand clutch member to the clutch-engaged condition. In the present invention on the other hand (as shown in FIGS. 16–18), when the turn increases to a 50° steer condition, the right hand clutch member 22 is maintained in the disengaged condition owing to the aforementioned offset angular relationship of the holdout rings.

Figure 19:
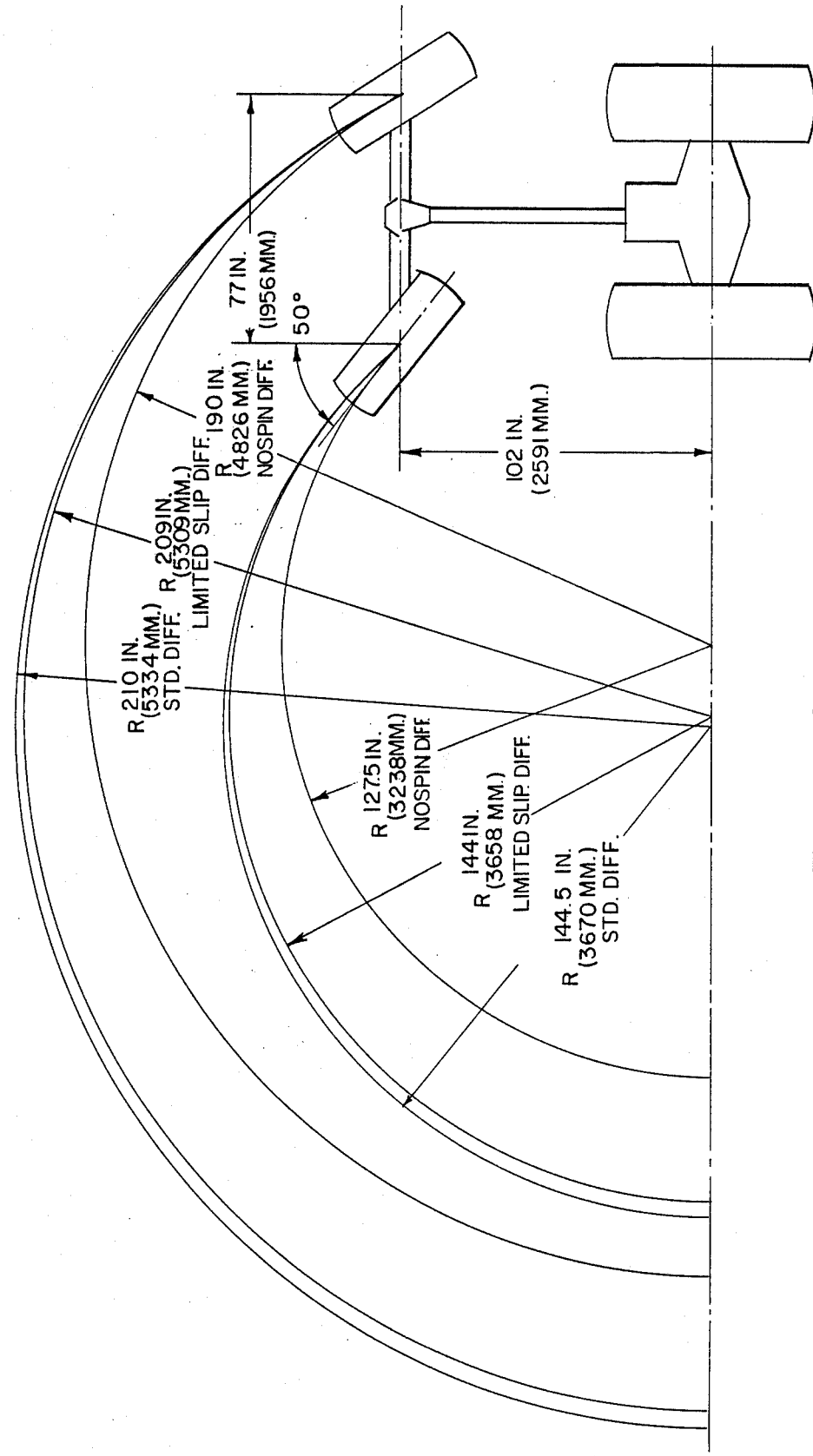
FIG. 19 is a diagram comparing the maneuverability at a 50° turn of a front wheel drive 4×4 tractor having a front axle assembly which includes, respectively, a standard differential, a limited slip differential, and a differential according to the present invention.
Figure 23:
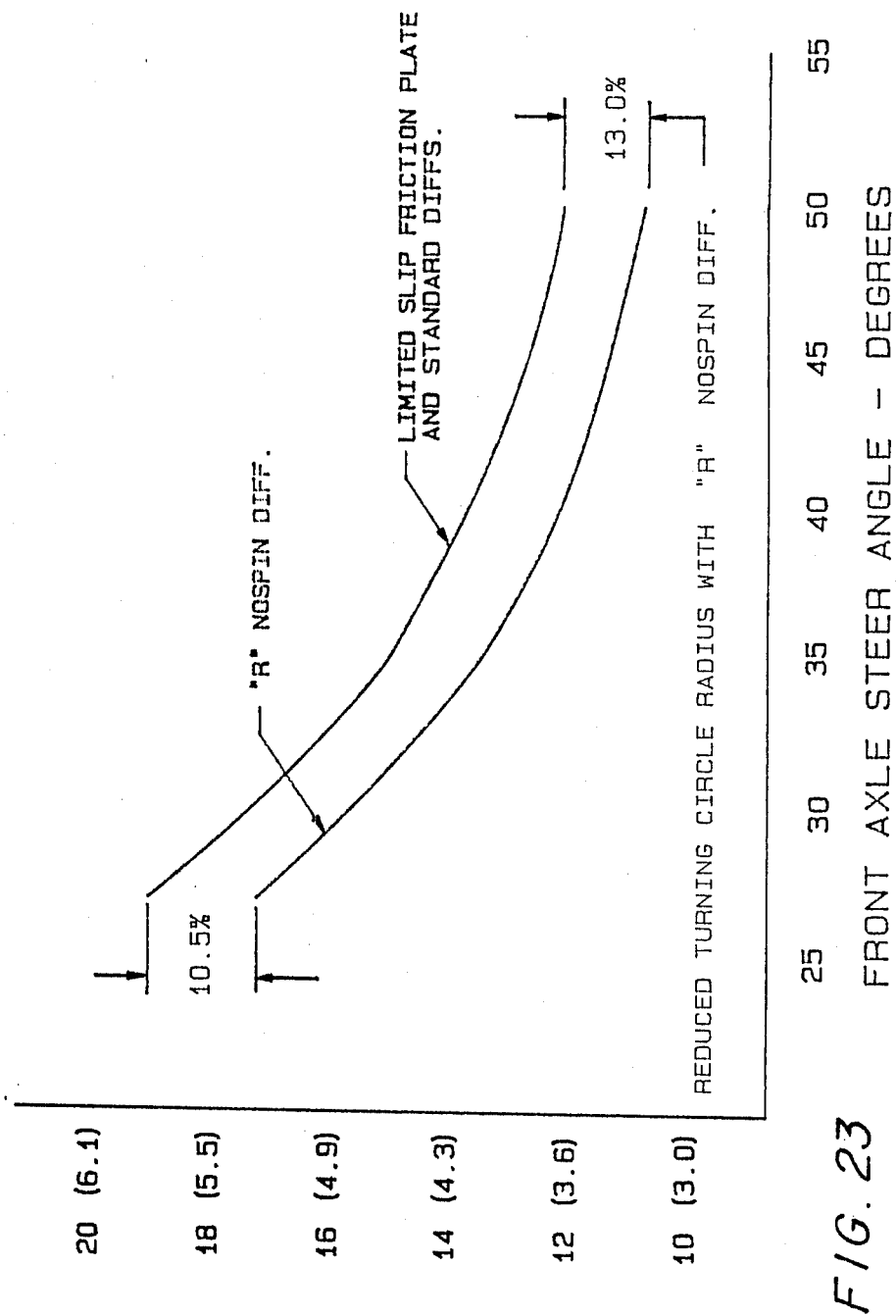

In FIG. 19, the turn radius of a four wheel drive vehicle is shorter when the steering wheel shafts are connected by a limited slip (friction plate) differential than by a standard differential, and an even tighter turn angle may be achieved by the use of the improved "No Spin" differential of the present invention. FIG. 20 illustrates the turning circle speed change (torque comparision) curves for turns at 50° and at 30°, respectively. The inside wheel radius is greater than the tractor radius at 50°, but the opposite is true at 30°, therefore, producing a torque reversal.

Referring to FIGS. 21 and 22, it will be seen that when the holdout ring 28 is in one end position (as limited by key portion 10b of center drive member 10 during forward operation), the portion of the extremity of holdout ring 28 that engages the stop shoulder on center cam member 24 is 0.289 inches while in the other end limit position of FIG. 22 during reverse operation, there is still a sufficient portion of the end extremity of the lug portion in engagement with the center cam shoulder (namely, 0.089 inches) to maintain the associated clutch member in the disengaged condition. Thus, satisfactory holdout ring operation is achieved with the aforementioned angularly displaced lug relationship between the two holdout rings.

Thus the improved differential insures that during a change of rotational direction, such is experienced with a high steer angle turn (i.e., greater than about 40°), the outside wheel remains disengaged and ground driven. The improved differential maintains a much smaller turning circle than either the limited slip (friction plate) type of differential or a conventional differential. Moreover, during tight turns, the outside wheel remains free and ground driven so that there is little tire scuff, less tire wear, less grassland damage or power loss, which is normally associated with a limited slip differential or a conventional differential. Furthermore, the outside wheel remains disengaged during a turn even when there is a change of directional force from the inside wheel, or torque reversal from the transmission (FIG. 20). The improved differential retains the ability to transmit 100% of available torque at all times. Testing has established that in order to achieve maximum differential operation, in the front axle of an agricultural tractor, there should be a minimum of positive 3% front axle overrun lead ratio.

What is claimed is:
1. A differential apparatus for driving from the drive shaft of a vehicle a pair of output shafts arranged colinearly end-to-end, comprising:
   (a) a rotatably driven annular center drive member arranged concentrically about the adjacent ends of the output shafts;
   (b) a pair of side gears adapted for non-rotatable mounting concentrically on the output shafts on opposite sides of said drive member, respectively;
   (c) a pair of clutch members mounted for axial displacement on said side gears between clutch-engaged and clutch-disengaged positions relative to said drive member, respectively, each of said clutch members normally being resiliently biased toward the clutch-engaged position relative to said drive member;
   (d) center cam means mounted concentrically within said drive member for coaxial angular adjustment relative thereto, said center cam means being operable to displace a given clutch member toward the clutch-disengaged position when the output shaft associated therewith overruns the other output shaft by a given amount; and
   (e) holdout ring means for maintaining said given clutch member in the disengaged condition as long as the associated output shaft continues to overrun the other output shaft, said holdout ring means including:
      (1) a pair of holdout rings mounted coaxially between said center cam member and said clutch members, respectively;
      (2) said holdout rings being rotatably connected at their remote ends with, and extending into corresponding grooves contained in the adjacent faces of, the associated clutch members, respectively;
      (3) said holdout rings being resiliently biased radially into frictional engagement with the associated clutch members, respectively;
      (4) said holdout rings including at their adjacent ends a plurality of equally-circumferentially-spaced axially-projecting lug portions that normally extend, when said holdout rings are in inoperative first positions, within corresponding recesses contained in said center cam member when said clutch members are in the clutch-engaged positions, respectively, each of said holdout rings being angularly adjustable, when the associated clutch member is in a clutch-disengaged condition, toward an operative holdout position in which the extremities of said lug portions abut corresponding holdout surfaces on said center cam member, respectively;

(5) the lug portions of one of said holdout rings being angularly offset relative to the lug portions of the other holdout ring, whereby when said holdout rings are in their normal operative positions, the overrunning clutch member is maintained in a disengaged condition in the event of torque reversal between the center driving member and the engaged clutch member.

2. Apparatus as defined in claim 1, wherein said vehicle is a multi-wheel-drive vehicle having steering wheels, and further wherein the output shafts drive said steering wheels, whereby the offset angular relationship of the lug portions of the holdout rings permits a sharp turning radius of the vehicle.

3. Apparatus as defined in claim 1, wherein said vehicle is a multi-wheel-drive vehicle having steering wheels and driven wheels, and further wherein the differential output shafts drive said driven wheels.

4. Apparatus as defined in claim 1, wherein each of said holdout rings is axially split to define a generally C-shaped configuration having leg portions defining a gap, and further including key means on said center drive member extending into the gaps of said holdout rings for limiting the extent of angular displacement of said holdout rings relative to said center drive member, respectively.

5. Apparatus as defined in claim 4, wherein the number of lugs on said holdout rings is the same, and further wherein the lugs on the holdout rings have different angular relationships relative to the associated gaps in the rings, respectively.

* * * * *